United States Patent
Cao et al.

(10) Patent No.: US 9,625,781 B2
(45) Date of Patent: Apr. 18, 2017

(54) ARRAY SUBSTRATE, DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Zhaokeng Cao, Shanghai (CN); Dandan Qin, Shanghai (CN); Tingting Cui, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/711,967

(22) Filed: May 14, 2015

(65) Prior Publication Data

US 2016/0187707 A1    Jun. 30, 2016

(30) Foreign Application Priority Data

Dec. 25, 2014 (CN) .......................... 2014 1 0844009

(51) Int. Cl.
*G02F 1/1362* (2006.01)
*G02F 1/1345* (2006.01)

(52) U.S. Cl.
CPC .... *G02F 1/136286* (2013.01); *G02F 1/13452* (2013.01)

(58) Field of Classification Search
CPC .......................... G02F 1/13627; G02F 1/136286
USPC ............................................................. 257/89
See application file for complete search history.

(56) References Cited

U.S. PATENT DOCUMENTS

2005/0068281 A1\* 3/2005 Shin .................. G02F 1/134336
345/88

FOREIGN PATENT DOCUMENTS

| CN | 102983132 A | 3/2013 |
| CN | 103926772 A | 7/2014 |
| CN | 104238214 A | 12/2014 |
| KR | 101146375 B1 | 12/2006 |

\* cited by examiner

*Primary Examiner* — Kenneth Parker
*Assistant Examiner* — Warren H Kilpatrick
(74) *Attorney, Agent, or Firm* — Faegre Baker Daniels LLP

(57) ABSTRACT

The present disclosure relates to an array substrate, a display panel and a display device. The array substrate includes a display area and a peripheral area surrounding the display area. The peripheral area includes a gate drive circuit which is electrically connected to a plurality of signal lines so as to provide the scanning signals to the display area. The display area includes a plurality of sub-pixels arranged in an array pattern and at least one wiring areas disposed between the sub-pixels, at least one signal line which is electrically connected to the gate drive circuit is provided in the at least one wiring areas.

20 Claims, 7 Drawing Sheets

ARRAY SUBSTRATE, DISPLAY PANEL AND DISPLAY DEVICE

CROSS-REFERENCE TO RELATED APPLICATION

This application claims priority to Chinese Application No. 201410844009.0, filed Dec. 25, 2014, which is herein incorporated by reference in its entirety.

TECHNICAL FIELD

The present disclosure relates to medical devices and methods for accessing an anatomical space of the body. More specifically, the disclosure relates to devices and methods for accessing the pericardial space of the heart in a minimally-invasive manner.

BACKGROUND

With the development of display technologies, a liquid crystal display panel has been widely used, and the display effect thereof has been continuously improved.

In order to implement a display scan of the liquid crystal display panel, a gate drive circuit is disposed in a peripheral area of an array substrate in the display panel to generate scanning signals, which are used for the display scan of the display panel. However, a plurality of signals are necessary for driving the gate drive circuit to generate the scanning signals, accordingly, a plurality of signal lines are provided in the peripheral area to transmit the signals for the driving. Therefore, a large space is required to accommodate these signal lines and the gate drive circuit such that a large peripheral area of the array substrate is required, which results in that a narrow frame of the display panel is difficult to be implemented.

SUMMARY

In view of this, an array substrate, a display panel and a display device are provided according to embodiments of the disclosure.

In a first aspect, embodiments of the disclosure provide an array substrate including a display area and a peripheral area surrounding the display area. The peripheral area includes a gate drive circuit which is electrically connected to a plurality of signal lines so as to provide scanning signals to the display area. The display area includes a plurality of sub-pixels arranged in an array pattern and at least one wiring area disposed among the sub-pixels. At least one signal line which is electrically connected to the gate drive circuit is provided in the at least one wiring area.

In a second aspect, embodiments of the disclosure provide a display panel including the array substrate described in the above first aspect, a substrate disposed opposite to the array substrate, and a display medium between the array substrate and the substrate disposed opposite to the array substrate.

In a third aspect, embodiments of the disclosure provide a display device including the display panel described in the second aspect.

With the technical solution of the array substrate, the display panel and the display device provided according to embodiments of the disclosure, at least one wiring area is disposed between the sub-pixels in the display area, and at least one signal line electrically connected to the gate drive circuit in the peripheral area is disposed in the at least wiring area, such that an area of the peripheral area of the array substrate is reduced, thereby easily implementing the narrow frame in the array substrate.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, purposes and advantages of the disclosure will become apparent from the detailed description of non-limiting embodiments made with reference to the following figures.

Figure 1:
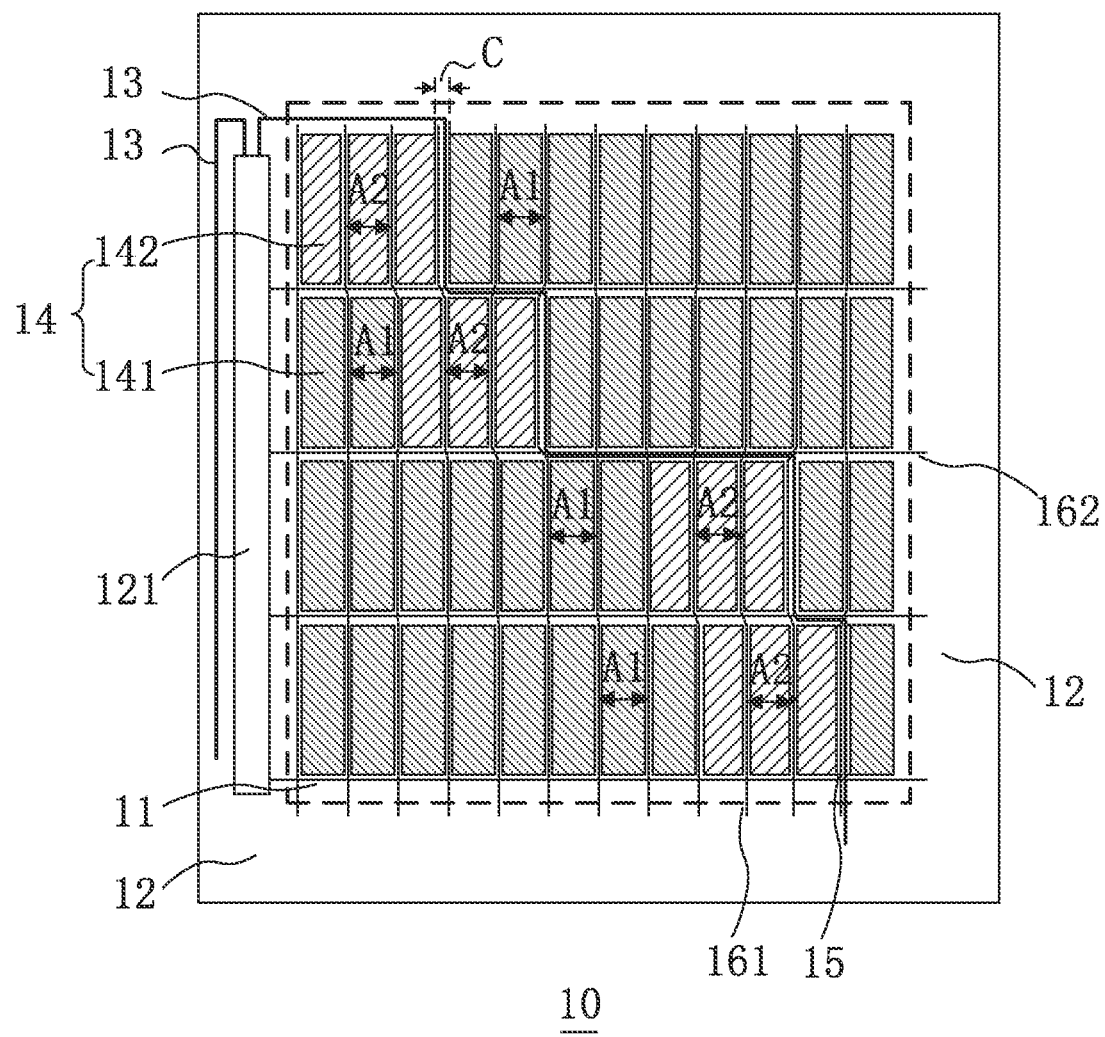
FIG. 1 is a schematic diagram showing a structure of an array substrate according to embodiments of the disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The present disclosure will be described below further in detail with reference to the accompanying drawings and the embodiments. It is appreciated that the specific embodiments described herein are merely used to explain the present disclosure, rather than limiting the present disclosure. It is further noted that merely a part related to the present disclosure of content, rather than all of content, is shown in the accompanying drawings for the sake of description.

An array substrate is provided according to embodiments of the disclosure. FIG. 1 is a schematic diagram showing a structure of an array substrate according to embodiments of the disclosure. As shown in FIG. 1, the array substrate 10 includes a display area 11 and a peripheral area 12 surrounding the display area 11, where the peripheral area 12 includes a gate drive circuit 121 which is electrically connected to a plurality of signal lines 13 and configured to generate scanning signals to be provided to the display area 11, the display area 11 includes a plurality of sub-pixels 14 arranged in an array pattern and wiring areas 15 disposed among the sub-pixels 14, and at least one signal line 13 which is electrically connected to gate drive circuit 121 is provided in the wiring areas 15.

It is noted that the gate drive circuit 121 may be any one of gate drive circuits in the relate art. The gate drive circuit 121 typically includes a plurality of stages of shift registers and may provide corresponding signals through the signal lines 13 which are electrically connected to the stages of shift registers, where the signal lines 13 may be initial trigger signal lines, clock signal lines, output enable signal lines, forward and backward scan control signal lines, level outputting signal lines, level turning-off signal lines and so on.

The wiring area 15 is disposed among the sub-pixels 14 in the display area 11, and at least one signal line 13 is disposed in the wiring area 15, the signal line 13 is electrically connected to the gate drive circuit 121 in the peripheral area 12. Therefore, an area of the peripheral area 12 of the array substrate is reduced, thereby easily implementing a narrow frame in the array substrate 10, as compared with disposing at least one signal line in the peripheral area.

As illustrated in FIG. 1, the sub-pixels 14 include first sub-pixels 141 with a first width A1 and second sub-pixels 142 with a second width A2, where the first width A1 is greater than the second width A2. The wiring area 15 is formed by a space saved by disposing at least one second sub-pixel 142 with the second width A2 in each row of sub-pixels 14. Before the second sub-pixels 142 with the second width A2 are disposed on the array substrate 10, the entire area of the array substrate 10 is provided with the first sub-pixels 141 with the first width A1, except for a reserved area for disposing the second sub-pixels 142 with the second width A2. With the at least one sub-pixel 142 with the second width A2 disposed in each row of sub-pixels 14 on the array substrate 10, due to that the first width A1 is greater than the second width A2, an area without any sub-pixels 14 is saved in each row of sub-pixels 14 and functions as the wiring area 15, then at least one signal line 13 may be disposed in the wiring area 15.

As shown in FIG. 1, each row of sub-pixels 14 include three sub-pixels 142 with the second width A2, that is, each row of sub-pixels 14 include the same number of the sub-pixels 142 with the second width A2. In some embodiments each row of sub-pixels 14 include the sub-pixels 142 with the second width A2. According to other embodiments, each row of sub-pixels 14 include another number of sub-pixels 142 with the second width A2, for example, one, two or four sub-pixels 142 with the second width A2 may be disposed in each row of sub-pixels 14, or each row of sub-pixels 14 may include a different number of sub-pixels 142 with the second width A2, which will not be limited here.

Further, as shown in FIG. 1, three adjacent sub-pixels 142 with the second width A2 are disposed in each row of sub-pixels 14 such that a wiring area 15 is formed. As illustrated in FIG. 1, a first to twelfth columns of sub-pixels 14 are shown from left to right; in the first row of sub-pixels 14, three adjacent sub-pixels 142 with the second width A2 are disposed in the first column to the third column such that a space is formed between the sub-pixel 142 with the second width A2 in the third column and the sub-pixel 141 with the first width A1 in the fourth column at the first row of sub-pixels 14, and functions as a wiring area 15 in the first row of sub-pixels 14. Similarly, a space is formed between the sub-pixel 142 with the second width A2 in the fifth column and the sub-pixel 141 with the first width A1 in the sixth column at the second row of sub-pixels 14 and functions as a wiring area 15 in the second row of sub-pixels 14. Further, a space is formed between the sub-pixel 142 with the second width A2 in the seventh column and the sub-pixel 141 with the first width A1 in the eighth column at the third row of sub-pixels 14 and functions as a wiring area 15 in the third row of sub-pixels 14. A space is formed between the sub-pixel 142 with the second width A2 in the eighth column and the sub-pixel 141 with the first width A1 in the ninth column at the fourth row of sub-pixels 14 and functions as a wiring area 15 in the fourth row of sub-pixels 14. The above wiring areas 15 disposed in four rows of the sub-pixels 14 construct one overall wiring area 15 disposed in the display area 11 of the array substrate 10.

As shown in FIG. 1, the wiring area 15 is formed by the space saved by arranging three adjacent sub-pixels 142 with the second width A2 in each row of sub-pixels 14, therefore a width C of the wiring area 15 is three times a difference between the first width A1 and the second width A2 as illustrated in FIG. 1, meanwhile, the width C=3 (the first width A1−the second width A2).

Figure 2:
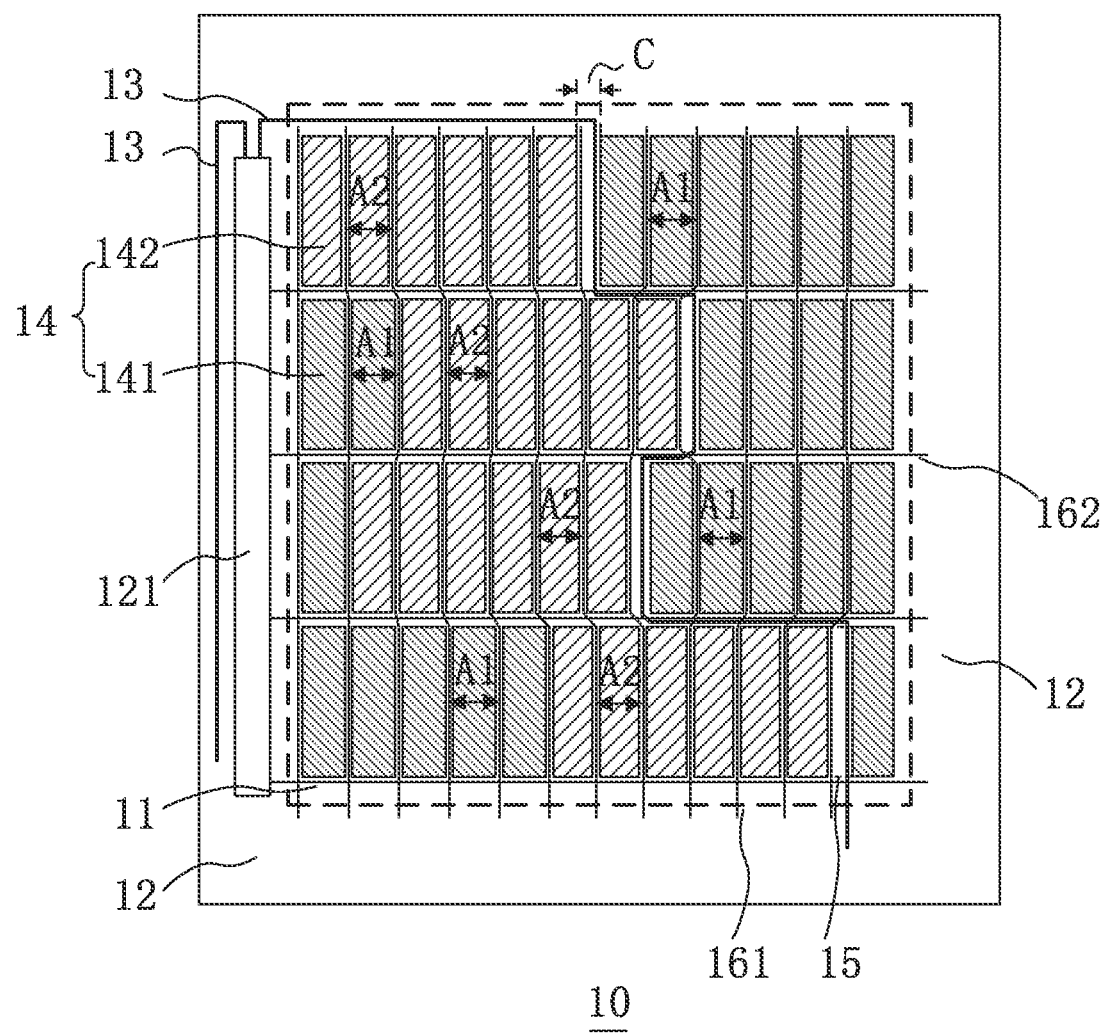
FIG. 2 is a schematic diagram showing a structure of another array substrate according to embodiments of the disclosure.

According to embodiments of the disclosure, as shown in FIG. 2, six adjacent sub-pixels 142 with the second width A2 are disposed in each row of sub-pixels 14 to form a space functioning as a wiring area 15. In FIG. 2, the first to twelfth columns of sub-pixels 14 are shown from left to right. In the first row of sub-pixels 14, six adjacent sub-pixels 142 with the second width A2 are disposed in the first column to the sixth column, therefore a space is formed between the sub-pixel 142 with the second width A2 in the sixth column and the sub-pixel 141 with the first width A1 in the seventh column at the first row of sub-pixels 14 and functions as a wiring area 15 in the first row of sub-pixels 14. Similarly, a space is formed between the sub-pixel 142 with the second width A2 in the eighth column and the sub-pixel 141 with the first width A1 in the ninth column at the second row of sub-pixels 14 and functions as a wiring area 15 in the second row of sub-pixels 14. A space is formed between the sub-pixel 142 with the second width A2 in the seventh column and the sub-pixel 141 with the first width A1 in the eighth column at the third row of sub-pixels 14 and functions as a wiring area 15 in the third row of sub-pixels 14. A space is formed between the sub-pixel 142 with the second width A2 in the eleventh column and the sub-pixel 141 with the first width A1 in the twelfth column at the fourth row of sub-pixels 14 and functions as a wiring area 15 in the fourth row of sub-pixels 14. The above wiring areas 15 disposed in four rows of sub-pixels construct one overall wiring area 15 in the display area 11 of the array substrate 10. Furthermore, as shown in FIG. 2, the wiring area 15 is formed by the space saved by arranging the six adjacent sub-pixels 142 with the second width A2 in each row of sub-pixels 14, therefore a width C of the wiring area 15 is six times the difference between the first width A1 and the second width A2 as shown in FIG. 2, meanwhile, the width C=6 (the first width A1−the second width A2).

Figure 3:
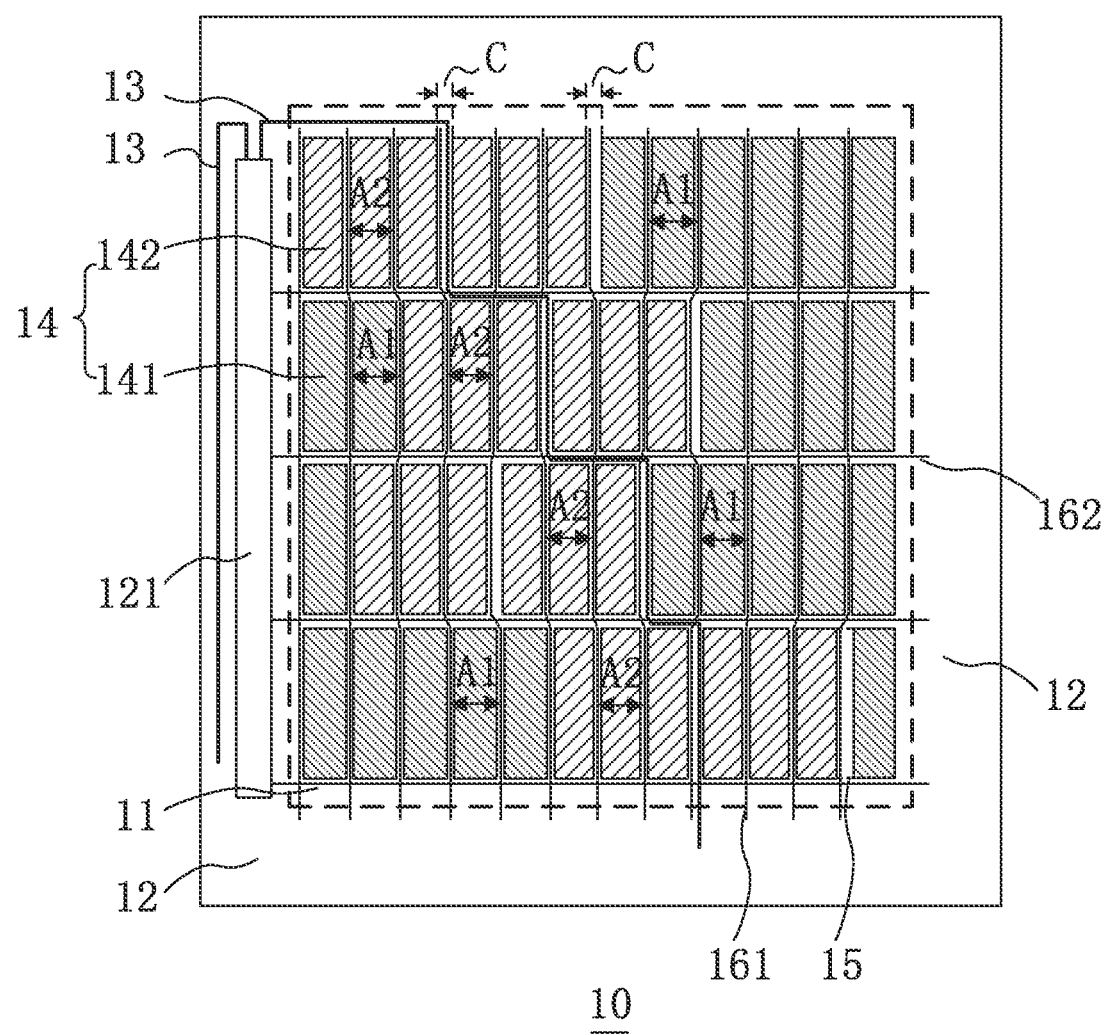
FIG. 3 is a schematic diagram showing a structure of yet another array substrate according to embodiments of the disclosure.
Figure 3A:
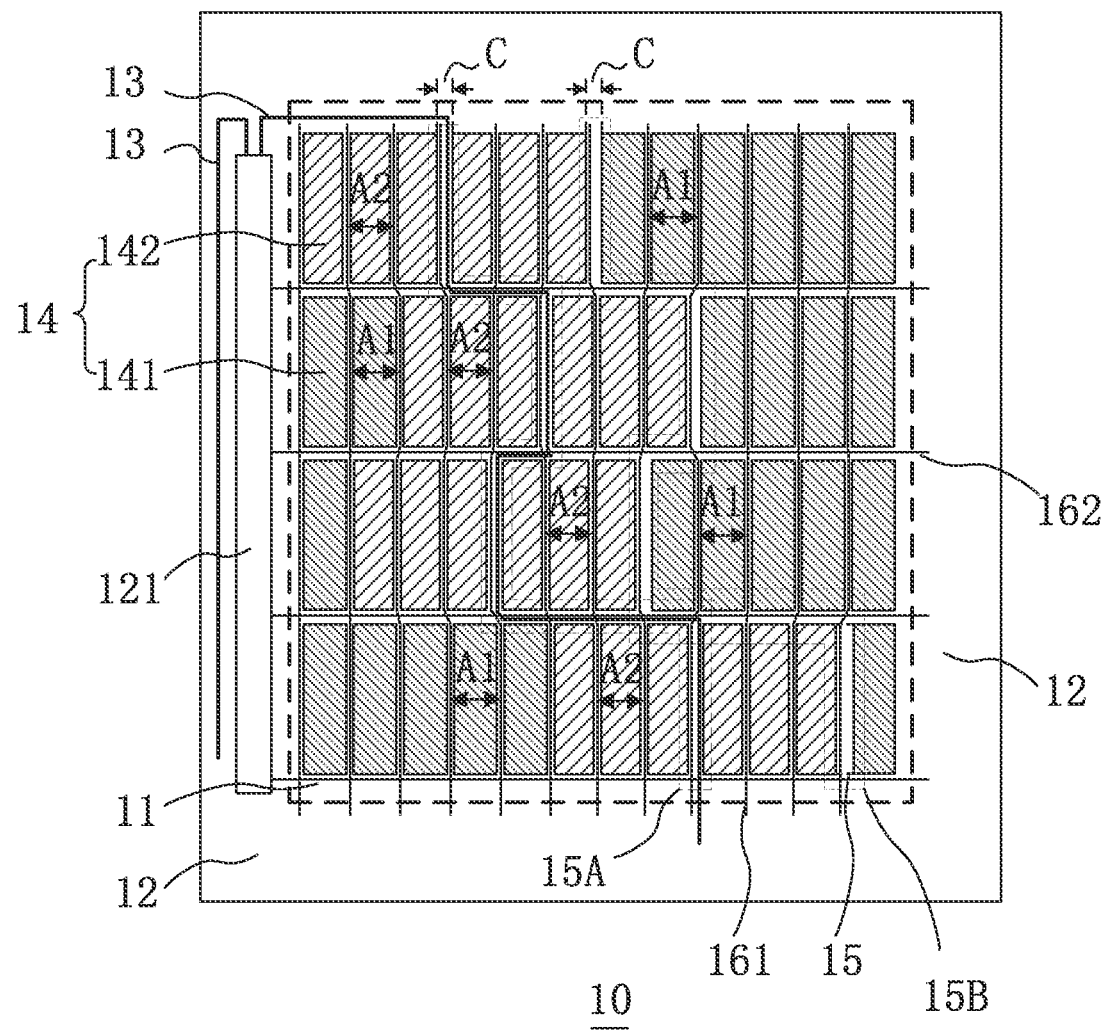
FIG. 3A is a schematic diagram showing a structure of yet another array substrate according to embodiments of the disclosure.

As shown in FIG. 2, each row of sub-pixels 14 include the six adjacent sub-pixels 142 with the second width A2 to save a space functioning as one wiring area 15, alternatively, a plurality of wiring areas 15 may be formed by spaces saved by disposing six adjacent sub-pixels 142 with the second width A2 in each row of sub-pixels 14. As shown in FIG. 3, the six adjacent sub-pixels 142 with the second width A2 in each row of sub-pixels 14 are disposed in the same columns as illustrated in FIG. 2, however, in the first row of sub-pixels 14, a space is formed between the sub-pixel 142 with the second width A2 in the third column and the sub-pixel 141 with the second width A2 in the fourth column and functions as wiring area 15 in the first row of sub-pixels 14; another space is formed between the sub-pixel 142 with the second width A2 in the sixth column and the sub-pixel 141 with the first width A1 in the seventh column and functions as another wiring area 15 in the first row of sub-pixels 14, that is, two wiring areas 15 are disposed in the first row of sub-pixels 14. Likewise, two wiring areas 15 are disposed in each of the rest rows of sub-pixels 14, therefore two constituted wiring areas 15A and 15B are formed in the display area 11 of the array substrate 10 (as shown in FIG. 3A). A width C of each wiring area 15 is three times the difference between the first width A1 and the second width A2 in FIG. 3.

As shown in FIG. 1, FIG. 2 and FIG. 3, sub-pixels 142 with the second width A2 in each row of sub-pixels 14 are disposed at a side of the display area 12, the side is close to the peripheral area 12. Due to the fact that the second width A2 is smaller than the first width A1, an aperture ratio of the sub-pixel 142 with the second width A2 is smaller than that of the sub-pixel 141 with the first width A1. In order to avoid an influence of the sub-pixel 142 with the second width A2 on a display effect of the array substrate 10, in an implementation, the sub-pixels 142 with the second width A2 in each row of sub-pixels 14 is disposed at a side, of the display area 11, the side is close to the peripheral area 12.

Further, as shown in FIG. 1, FIG. 2 and FIG. 3, the wiring areas 15 are disposed at a side of the display area 11, the side is close to the peripheral area 12. Due to the optical opacity of the wiring areas 15, an influence of the wiring areas 15 on the array substrate 10 can be avoided if the wiring areas 15 are disposed at a side, closing to the peripheral area 12, of the display area 11.

According to embodiments of the disclosure, the first width A1 may be in a range from 12 μm to 26.5 μm. A specific value of the first width A1 can be selected according to actual requirements in design, which will not be limited here.

According to embodiments of the disclosure, the difference between the first width A1 and the second width A2 may be in a range from 0.5 μm to 2.5 μm. Since the width of the wiring area 15 is related to the difference between the first width A1 and the second width A2, the difference between the first width A1 and the second width A2 can be selected according to the width of the wiring area 15, which will not be limited here.

As shown in FIG. 1 to FIG. 3, the array substrate 10 further includes a plurality of data lines which are disposed in the display area 11. In some embodiments, the signal lines 13 disposed in the wiring area 15 may be in the same layer as and electrically insulated from the data lines 161. When disposing the signal lines 13 and the data lines 161, the signal lines 13 run across the data lines 161 or the data lines 161 run across the signal lines 13 by bridge structures at the intersections between the signal lines 13 or the data lines 161, thereby preventing the signal lines 13 and the data lines 161 from a short circuit. The bridge structure is common means in the related art, and will not be described herein. If the signal lines 13 disposed in the wiring areas 15 are in the same layer as and electrically insulated from the data lines 161, the signal lines 13 disposed in the wiring areas 15 and the data lines 161 may be formed in a common manufacture process, therefore, not only steps of the manufactured processes for the array substrate 10 but also the manufacturing cost is reduced.

As shown in FIG. 1 to FIG. 3, the array substrate 10 further include a plurality of scan lines 162 which are disposed in the display area 11, and the scan lines 162 are electrically connected to the gate drive circuit 121 to receive the scan signals generated by the gate drive circuit 121. In some embodiments, the signal lines 13 disposed in the wiring areas 15 may be in the same layer as and electrically insulated from the scan lines 162. When forming the signal lines 13 and the scan lines 162, the signal lines 13 run across the scan lines 162 or the scan lines 162 run across the signal lines 13 by bridge structures at the intersections between the signal lines 13 and the scan lines 162, thereby preventing the signal lines 13 and the scan lines 162 from a short circuit. The bridge structure is common means in the related art, which will not be described herein. If the signal lines 13 disposed in the wiring areas 15 are arranged in the same layer as and electrically insulated from the scan lines 162, the signal lines 13 disposed in the wiring area 15 and the scan lines 162 may be formed by a common manufacture process, therefore not only the manufacturing process for the array substrate 10 is simplified but also the manufacturing cost is reduced.

As shown in FIG. 1 to FIG. 3, the signal lines 13 disposed in the wiring areas 15 have a polygonal line shape. Due the optical opacity of the wiring areas 15, when the wiring area 15 is arranged in each row of sub-pixels 14, the wiring areas 15 disposed in two or more adjacent rows of sub-pixels 14 may be arranged in different columns, alternatively, the wiring areas 15 disposed in all rows of sub-pixels 14 are arranged in different columns. Accordingly, the signal lines 13 disposed in the wiring areas 15 have a polygonal line shape to alleviate the influence of the wiring areas 15 on the display effect of the array substrate 10.

According to embodiments of the disclosure, the signal lines 13 disposed in the wiring areas 15 are initial trigger signal lines which are configured to provide the gate drive circuit 121 with the initial trigger signals. Among various signal lines for providing the gate drive circuit 121 with signals, the initial trigger signal lines are only required to be electrically connected to the first stage of shift register in the gate drive circuit 121 and provide the first stage of shift register with initial trigger signals, while the clock signal lines, the output enable signal lines, the forward and backward scan control signal lines, the level outputting signal lines and the level turning-off signal lines are required to be electrically connected to respective stages of shift registers and provide the respective stages of shift registers with corresponding signals. Therefore in some embodiments, considering the existing technologies and processes, the initial trigger signal lines are disposed in the wiring areas 15, and other signal lines may be disposed in the peripheral area.

It is noted that structures shown in above figures are merely some embodiments of the disclosure, and the number of the sub-pixels with the second width in each row of sub-pixels, the arrangement of the sub-pixels with the second width in each row of sub-pixels, the locations of the sub-pixels with the second width in the display area 11, the number of the wiring areas 15, the locations of the wiring areas 15 in the display area 11, the number and the shape of the signal lines in the wiring areas 15 will not be limited here.

Figure 4:
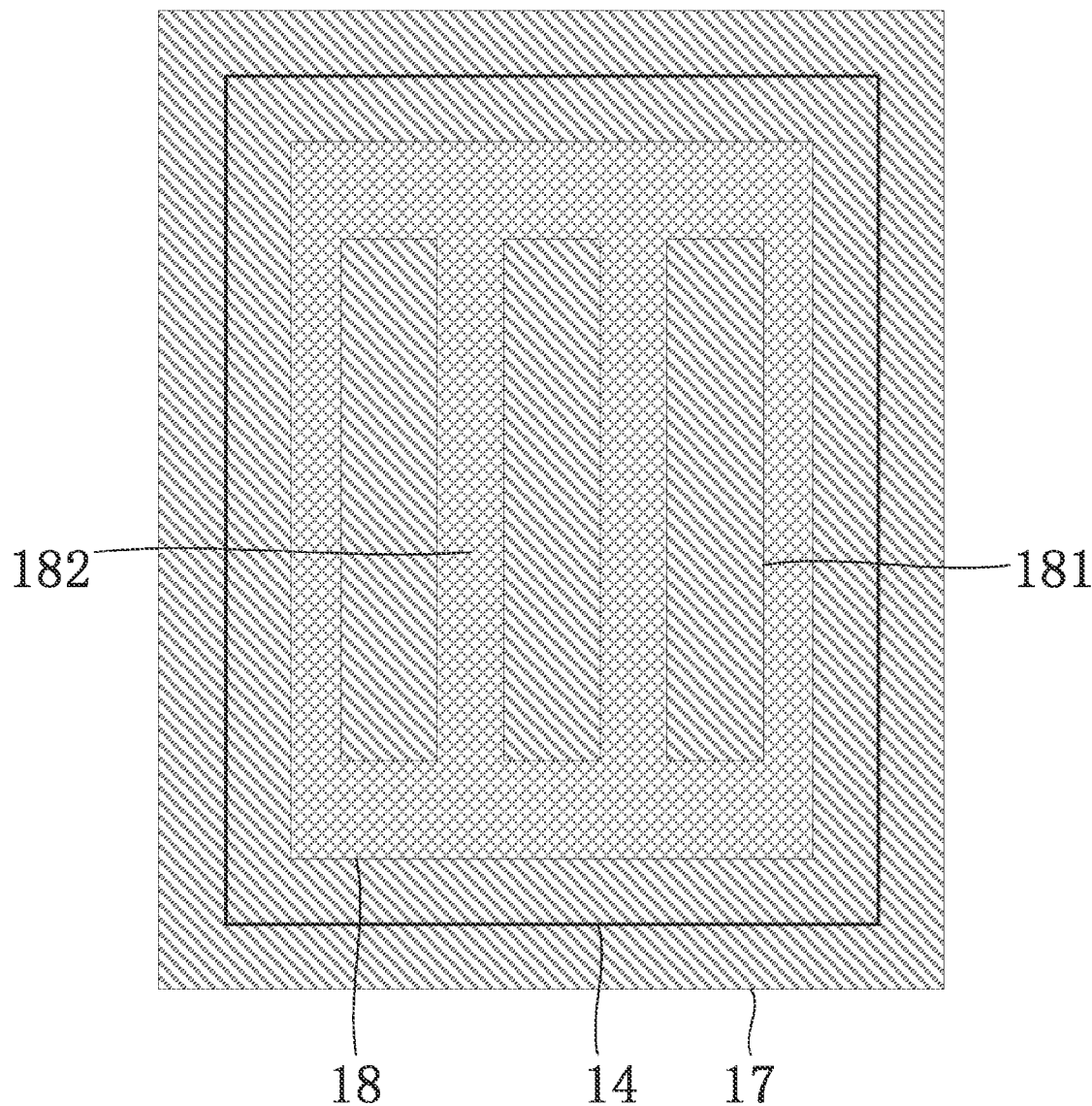
FIG. 4 is a schematic diagram showing a structure of still yet another array substrate according to embodiments of the disclosure.

In addition to the structures of the array substrate 10 according to above embodiments of the disclosure, the array substrate 10 further includes a common electrode 17, and a pixel electrode 18 disposed in each of sub-pixels 14, as shown in FIG. 4, and the common electrode 17 is disposed at a side of the pixel electrode 18. It is noted that only one sub-pixel 14, a pixel electrode 18 disposed in the sub-pixel 14 and a common electrode 17 corresponding to the sub-pixel 14 are shown in FIG. 4, and in the entire array substrate 10, the pixel electrodes 18 disposed in a plurality of sub-pixels 14 are arranged in an array pattern just like the sub-pixels 14, and the common electrodes 17 corresponding to the sub-pixels 14 are connected to form a plane.

As shown in FIG. 4, the common electrode 17 is disposed below the pixel electrode 18, and the pixel electrode 18 includes a plurality of first slits 181 and a plurality of first strips 182 each disposed between two adjacent first silts 181. The array substrate 10 as shown in FIG. 4 may correspond to a Fringe Field Switching (FFS) type liquid crystal driving pattern and is a structure with the common electrode 17 being disposed below the pixel electrode 18.

According to embodiments of the array substrate 10, a size of the sub-pixel mainly depends on a size of the pixel electrode or a size of an area in the common electrode 17 that corresponds to the sub-pixel, therefore, a pixel electrode with the second width is obtained by reducing the width of the first slits and the width of the first strips of a pixel electrode in the sub-pixels with the first width.

Figure 5:
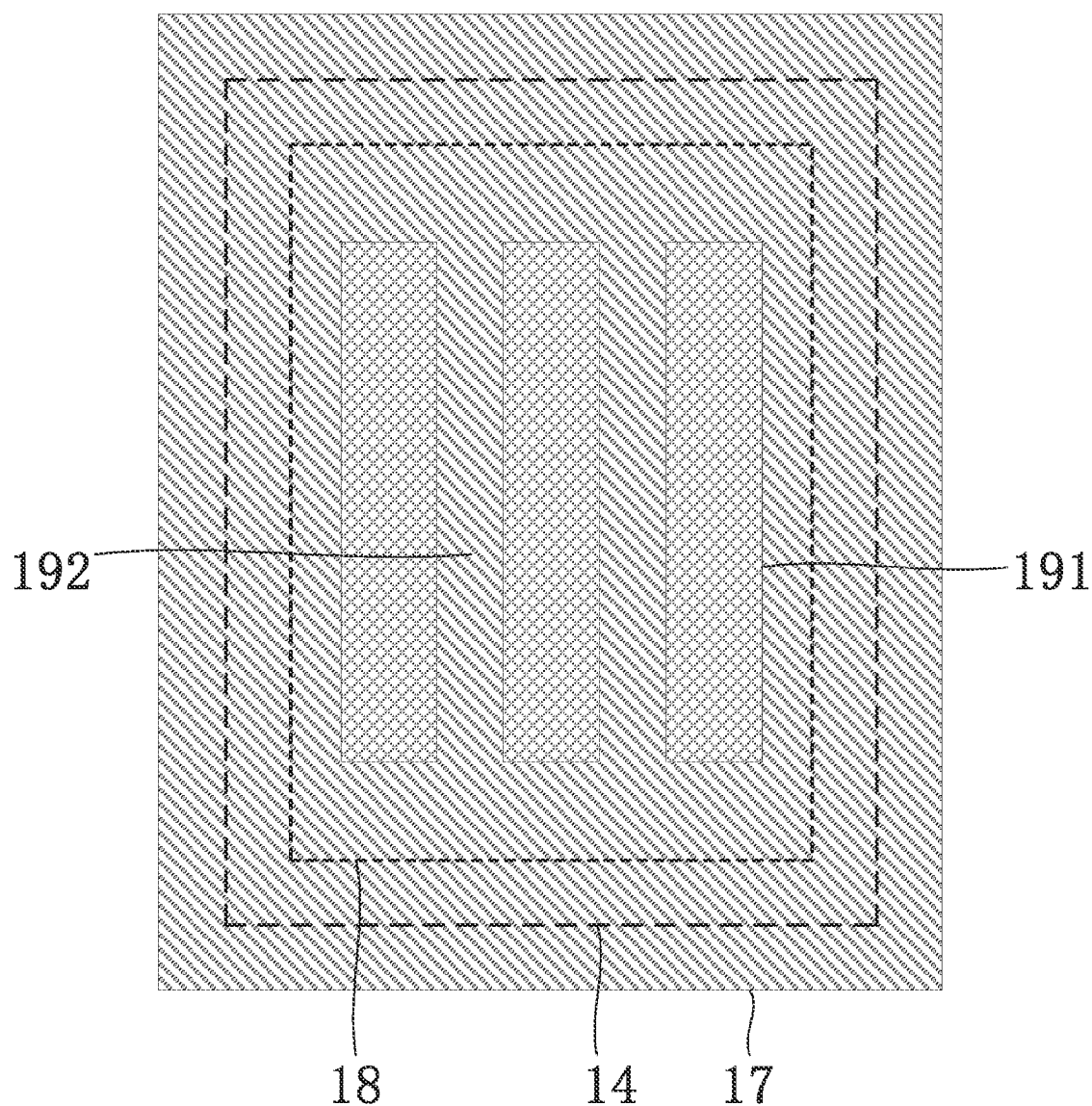
FIG. 5 is a schematic diagram showing a structure of still yet another array substrate according to embodiments of the disclosure.

However, in the array substrate 10 corresponding to an FFS type liquid crystal driving pattern, the common electrode may be disposed above the pixel electrodes 18. As shown in FIG. 5, the array substrate further include a common electrode 17 and a pixel electrode 18 disposed in each one of sub-pixels 14, the common electrode 17 is disposed above the pixel electrode 18 in each sub-pixel. An area of the common electrode 17 that corresponds to the sub-pixel 14 comprises a plurality of second slits 191 and a plurality of second strips 192 each disposed between two adjacent ones of the plurality of second slits 191. It is noted that only one sub-pixel 14, a pixel electrode 18 disposed in the sub-pixel 14 and one common electrode 17 corresponding to the sub-pixel 14 are shown in FIG. 5, and in the entire array substrate 10, the pixel electrodes 18 disposed in the plurality of sub-pixels 14 are arranged in an array pattern just like the sub-pixels 14, the pixel electrodes 18 and the common electrodes 17 corresponding to the plurality of sub-pixels 14 are connected to form a plane.

According to embodiments of the array substrate 10, a size of the sub-pixel mainly depends on a size of the pixel electrode or a size of an area in the common electrode 17 that corresponds to the sub-pixel, therefore, a pixel electrode with the second width is obtained by reducing the width of the first slits and the width of the first strips of a pixel electrode in the sub-pixels with the first width.

Figure 6:
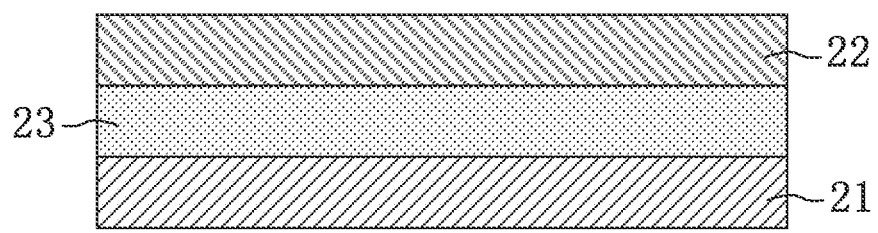
FIG. 6 is a schematic diagram showing a structure of a display panel according to embodiments of the disclosure.

A display panel is provided according to embodiments of the disclosure. FIG. 6 is a schematic diagram showing a structure of a display panel according to embodiments of the disclosure. As shown in FIG. 6, the display panel includes an array substrate 21, a substrate disposed 22 opposite to the array substrate 21 and an display medium 23 disposed between the array substrate 21 and the opposite substrate 22, where the substrate disposed 22 opposite to the array substrate 21 may refer to a color film substrate, the display medium 23 may refer to a liquid crystal layer, the array substrate 21 may refer to the array substrate according to the above various embodiments.

It is noted that the display panel may have or not have a touch sensing function, which depends on specific requirements in practice. The touch sensing function may be an electromagnetic touch function, a capacitive touch function, an electromagnetic capacitive touch function or the like.

Figure 7:
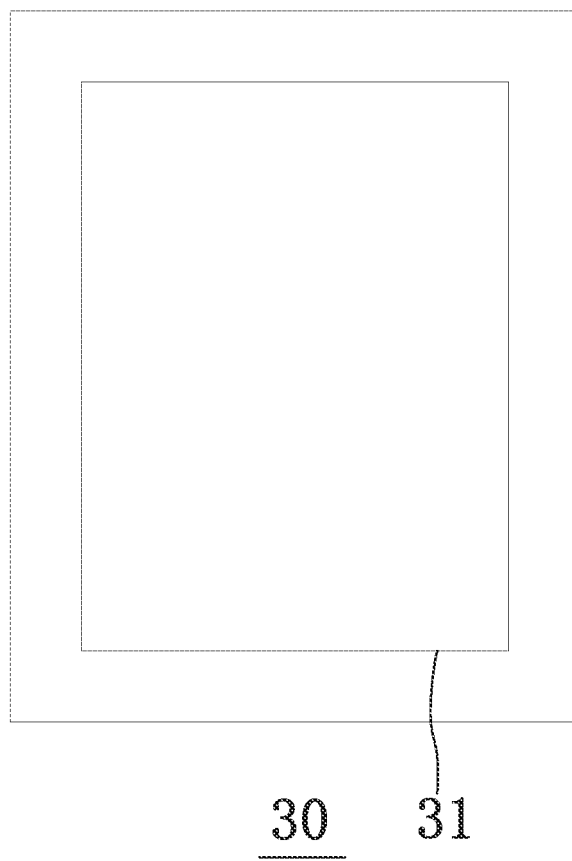
FIG. 7 is a schematic diagram showing a structure of a display panel according to embodiments of the disclosure.

According to embodiments of the disclosure, a display device is further provided. FIG. 7 is a schematic diagram showing a structure of a display panel according to embodiments of the disclosure. As shown in FIG. 7, the display device 30 includes a display panel 31, and may further include other components for supporting a normal operation of the display panel 31. The display panel 31 may be any one of the display panel described in the above various embodiments. The above display device 30 may be one of a mobile phone, a desktop computer, a notebook computer, a tablet computer and an electronic paper.

According to embodiments of the disclosure, an array substrate, an display panel and a display device are provided. The wiring areas are disposed among the sub-pixels in the display area, and at least one signal line electrically connected to the gate drive circuit in the peripheral area is disposed in the wiring areas, thus, an area of the peripheral area of the array substrate is reduced, thereby easily implementing a narrow frame of the array substrate.

It is noted that the embodiments and the technology principles of the present disclosure described as above are merely illustrative. It should be understood for those skilled in the art that the disclosure is not limited to the particular embodiments described herein. Various apparent changes, readjustment and alternatives can be made by those skilled in the art without departing from the scope of the disclosure. Therefore, although the disclosure is illustrated in detail through the above embodiments, the disclosure is not merely limited to the above embodiments, and can further include other equivalent embodiments without departing from the concept of the disclosure. The scope of the disclosure is subject to the appended claims.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. An array substrate comprising a display area and a peripheral area surrounding the display area, wherein,
    the peripheral area comprises a gate drive circuit which is electrically connected to a plurality of signal lines so as to provide scanning signals to the display area wherein the plurality of signal lines transmit signals for driving the gate drive circuit to generate the scanning signals;
    the display area comprises a plurality of sub-pixels arranged in an array pattern and at least one wiring area disposed among the sub-pixels, and at least one of the plurality of signal lines which are electrically connected to the gate drive circuit is provided in the at least one wiring area.

2. The array substrate of claim 1, wherein the plurality of sub-pixels comprise first sub-pixels with a first width and at least one second sub-pixel with a second width, and the first width is greater than the second width;
    the at least one wiring area is formed by a space, which is saved by disposing the at least one second sub-pixel with the second width in each row of sub-pixels.

3. The array substrate of claim 2, wherein each row of sub-pixels comprises the same number of the second sub-pixels with the second width.

4. The array substrate of claim 3, wherein each row of sub-pixels comprises three adjacent second sub-pixels with the second width to form one wiring area.

5. The array substrate of claim 4, wherein a width of the wiring area is three times a difference between the first width and the second width.

6. The array substrate of claim 3, wherein each row of sub-pixels comprises six adjacent second sub-pixels with the second width to form one or two wiring areas.

7. The array substrate of claim 6, wherein a width of the wiring area is six times a difference between the first width and the second width if one wiring area is formed.

8. The array substrate of claim 2, wherein the second sub-pixel with the second width in each row of sub-pixels is disposed at a side of the display area, the side is close to the peripheral area.

9. The array substrate of claim 2, wherein the first width is in a range from 12 μm to 26.5 μm.

10. The array substrate of claim 9, wherein a difference between the first width and the second width is in a range from 0.5 μm to 2.5 μm.

11. The array substrate of claim 1, wherein the wiring area is disposed at a side of the display area, the side is close to the peripheral area.

12. The array substrate of claim 1, wherein the array substrate further comprises a plurality of data lines disposed in the display area, and the signal lines disposed in the wiring area are disposed in the same layer as the data lines.

13. The array substrate of claim 1, wherein the array substrate further comprises a plurality of scan lines disposed in the display area, and the signal lines disposed in the wiring area are disposed in the same layer as the scan lines.

14. The array substrate of claim 1, wherein the signal lines disposed in the wiring area have a polygonal line shape.

15. The array substrate of claim 1, wherein the signal line disposed in the wiring area comprises a initial trigger signal line for providing the gate drive circuit with a initial trigger signal.

16. The array substrate of claim 1, wherein the array substrate further comprises a common electrode, and a pixel electrode disposed in each of the plurality of sub-pixels.

17. The array substrate of claim 16, wherein the common electrode is disposed below the pixel electrode, and the pixel electrode comprises a plurality of first slits and a plurality of first strips each disposed between two adjacent ones of the plurality of first slits.

18. The array substrate of claim 16, wherein the common electrode is disposed above the pixel electrode, and an area of the common electrode that corresponds to the sub-pixel comprises a plurality of second slits and a plurality of second strips each disposed between two adjacent ones of the plurality of second slits.

19. A display panel comprising an array substrate, a substrate disposed opposite to the array substrate, and a display medium between the array substrate and the substrate disposed opposite to the array substrate; wherein the array substrate comprises a display area and a peripheral area surrounding the display area, the peripheral area comprises a gate drive circuit which is electrically connected to a plurality of signal lines so as to provide scanning signals to the display area, wherein the plurality of signal lines transmit signals for driving the gate drive circuit to generate the scanning signals; the display area comprises a plurality of sub-pixels arranged in an array pattern and at least one wiring area disposed among the sub-pixels, and at least one of the plurality of signal lines which are electrically connected to the gate drive circuit is provided in the at least one wiring area.

20. A display device comprising a display panel comprising an array substrate, a substrate disposed opposite to the array substrate, and a display medium between the array substrate and the substrate disposed opposite to the array substrate; wherein the array substrate comprises a display area and a peripheral area surrounding the display area, the peripheral area comprises a gate drive circuit which is electrically connected to a plurality of signal lines so as to provide scanning signals to the display area, wherein the plurality of signal lines transmit signals for driving the gate drive circuit to generate the scanning signals; the display area comprises a plurality of sub-pixels arranged in an array pattern and at least one wiring area disposed among the sub-pixels, and at least one of the plurality of signal lines which are electrically connected to the gate drive circuit is provided in the at least one wiring area.

* * * * *